(12) United States Patent
Richter et al.

(10) Patent No.: US 9,631,743 B2
(45) Date of Patent: Apr. 25, 2017

(54) RELEASABLE CONNECTOR FOR SUPPORTING A FLEXIBLE CONDUIT

(71) Applicant: The Metraflex Company, Chicago, IL (US)

(72) Inventors: James R Richter, Lincolnshire, IL (US); Daniel T Holbach, Palatine, IL (US); Martin I Rogin, Libertyville, IL (US); Daniel R Kish, Chicago, IL (US); James D Clauss, Frankfort, IL (US)

(73) Assignee: The Metraflex Company, Chicago, IL (US)

( * ) Notice: Subject to any disclaimer, the term of this patent is extended or adjusted under 35 U.S.C. 154(b) by 43 days.

(21) Appl. No.: 14/496,144

(22) Filed: Sep. 25, 2014

(65) Prior Publication Data

US 2016/0091120 A1 Mar. 31, 2016

(51) Int. Cl.
| | |
|---|---|
| F16L 3/00 | (2006.01) |
| F16L 3/133 | (2006.01) |
| F16L 3/01 | (2006.01) |
| F16L 3/12 | (2006.01) |
| F16L 51/04 | (2006.01) |

(52) U.S. Cl.
CPC ............... *F16L 3/133* (2013.01); *F16L 3/01* (2013.01); *F16L 3/1218* (2013.01); *F16L 51/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 933,625 | A * | 9/1909 | Clarkson | F16G 15/08 403/164 |
| 1,618,851 | A * | 2/1927 | Thunberg | F16G 11/10 24/652 |
| 1,924,353 | A * | 8/1933 | Fitzpatrick | F16L 3/133 248/59 |
| 2,038,466 | A * | 4/1936 | Yates | F16D 3/221 464/140 |
| 2,158,802 | A * | 5/1939 | Redlon | F16L 3/133 248/62 |

(Continued)

OTHER PUBLICATIONS

Patent Cooperation Treaty, PCT International Search Report from corresponding International Application PCT/US2015/051689, dated Dec. 29, 2015.

(Continued)

*Primary Examiner* — Monica Millner
(74) *Attorney, Agent, or Firm* — Greer, Burns & Crain, Ltd.

(57) ABSTRACT

A flexible conduit having a rigid portion, a flexible portion and a releasable connector secured to the rigid portion to support the flexible conduit. The releasable connector includes a male member and a female member. One of the two members includes at least one biased plungers and the other includes at least one detent. The plungers and detents are vertically spaced along the longitudinal axes of the members. A clevis may be used to secure the releasable connector to the rigid portion of the flexible conduit. A second support connected to the male and female members may be used. Also a method of supporting a flexible conduit with a releasable connector.

19 Claims, 6 Drawing Sheets

(56) References Cited

U.S. PATENT DOCUMENTS

| | | | | |
|---|---|---|---|---|
| 2,511,335 | A | * | 6/1950 | Guarnaschelli .......... B61G 5/08 248/53 |
| 2,748,236 | A | * | 5/1956 | Landis .................. B23K 9/287 219/137.51 |
| 3,199,553 | A | * | 8/1965 | Garrett ................... B63B 27/18 137/615 |
| 3,659,329 | A | | 5/1972 | Walker |
| 3,694,011 | A | * | 9/1972 | Silverman ............... E03F 9/002 15/104.33 |
| 3,985,213 | A | | 10/1976 | Braggins |
| 4,105,177 | A | | 8/1978 | Smith |
| 4,185,477 | A | | 1/1980 | van der Lely |
| 4,306,696 | A | * | 12/1981 | Pondman .................. F16L 3/16 248/59 |
| 4,344,729 | A | | 8/1982 | Orsinger |
| 4,406,148 | A | | 9/1983 | Knight |
| 4,524,934 | A | * | 6/1985 | Rumble .................. F16L 3/133 248/59 |
| 4,524,935 | A | * | 6/1985 | Rumble .................. F16L 3/133 248/59 |
| 4,687,365 | A | * | 8/1987 | Promersberger ........ F16G 11/08 254/134.3 FT |
| 4,932,626 | A | | 6/1990 | Guillot |
| 4,989,903 | A | * | 2/1991 | McAllister ............... F16L 3/01 285/114 |
| 5,167,437 | A | | 12/1992 | Merten |
| 5,195,784 | A | | 3/1993 | Richter |
| 5,303,885 | A | | 4/1994 | Wade |
| 5,459,476 | A | | 10/1995 | Hsieh |
| 5,484,219 | A | | 1/1996 | Drew |
| 5,697,480 | A | | 12/1997 | Herbermann |
| 5,803,506 | A | * | 9/1998 | Argersinger ............ F16L 51/04 285/14 |
| 5,836,361 | A | | 11/1998 | Koncsek |
| 6,322,276 | B1 | | 11/2001 | Liu |
| 6,554,524 | B1 | | 4/2003 | Smith |
| 6,887,022 | B2 | | 5/2005 | Choate |
| 7,249,704 | B1 | | 7/2007 | Smith |
| 7,284,728 | B2 | * | 10/2007 | Connolly .................. F16L 3/11 248/58 |
| 7,748,091 | B2 | * | 7/2010 | Bogh-Sorensen .... F16B 21/165 24/573.11 |
| 8,181,305 | B2 | | 5/2012 | Boos |
| 8,210,580 | B2 | | 7/2012 | Engel |
| 2004/0018042 | A1 | | 1/2004 | Smith |
| 2005/0081458 | A1 | | 4/2005 | McDonald |
| 2009/0194992 | A1 | | 8/2009 | Bochenek et al. |
| 2009/0224533 | A1 | * | 9/2009 | Richter .................. F16L 51/04 285/61 |
| 2012/0310371 | A1 | | 12/2012 | Bachus |
| 2013/0192944 | A1 | | 8/2013 | Zimmerman et al. |

OTHER PUBLICATIONS

Patent Cooperation Treaty, PCT Written Opinion of the International Searching Authority from corresponding International Application PCT/US2015/051689, dated Dec. 29, 2015.

* cited by examiner

RELEASABLE CONNECTOR FOR SUPPORTING A FLEXIBLE CONDUIT

CROSS-REFERENCES TO RELATED APPLICATIONS

None.

BACKGROUND OF THE INVENTION

The present invention relates to a flexible conduit, and more particularly to a flexible conduit having a releasable connector for supporting the flexible conduit.

In the construction of buildings and other structures, it is known to use conduits that include a flexible portion to accommodate movement of the conduit. The movement can be intentional, for example, based upon thermal changes, or misalignment in a piping system, or unintentional, such as from a natural disaster, like an earthquake. Additionally, the movement can dampen vibration of the conduits and reduce the transmission of noise through the conduit. Such a flexible conduit is disclosed, for example, in U.S. Pat. No. 5,195,784.

In order to support the conduit, the flexible portion of the conduit may be connected to an anchor or anchoring means. For example, U.S. Pat. No. 5,195,784 discloses using one or more rods to support the flexible portion of the conduit by securing one end of the rod thereto and by anchoring the other end of the rod into a ceiling or other structural support member.

While presumably effective for its intended purpose, the anchoring rods are relatively rigid. Accordingly, if forces acting on the flexible conduit are not strong enough to break or bend the rod, the flexible conduit could break instead. This could be dangerous with objects falling, and depending on the fluids in the conduit, could be deadly. Additionally, based upon the length of the flexible members of the flexible conduit, an undesirable and unappealing sagging of the flexible members may occur.

Thus, it would be desirable to provide for a flexible conduit that is supported, but, when the flexible conduit is subjected to certain forces, the support disengages so as to avoid the flexible conduit breaking.

Additionally, it would further be desirable to provide a flexible conduit that can be adjusted so that the amount of force needed to disengage the flexible conduit from the support could be varied based upon particular applications.

Furthermore, it would also be desirable to provide such a flexible conduit with a secondary support to support the flexible conduit if a primary support has been disengaged.

Finally, it would be desirable to have a flexible conduit that is supported but allowed to fully bend and flex as desired.

SUMMARY OF THE INVENTION

A new flexible conduit having a releasable connector to support the flexible conduit has been invented.

According to a first aspect of the present invention, the present invention comprises a flexible conduit with at least one flexible member, at least one rigid member, and, a releasable connector. The releasable connector comprises a female member comprising a body with an attachment member at a first end and a cavity with an open end at a second end, and, a male member having a body with a shaft configured to be received in the cavity of the female member. The shaft of the male member includes a first end having an attachment member. A first member comprises one of the female member and the male member. The first member further comprises at least one biased plunger, with each biased plunger disposed in an aperture. Each biased plunger also includes a biasing element for biasing the biased plunger. A second member also comprises one of the female member and the male member, but the second member is different than the first member. The second member further comprises at least one detent. The at least one biased plunger is configured to engage a detent in order to secure the shaft of the male member in the cavity of the female member. One of the attachment members secures the releasable connector to at least one rigid member, at least one flexible member, or both.

In some embodiments, the flexible conduit further includes a secondary cable having a first end and a second end. The first end of the secondary cable is secured to one of the attachment members on the female member or the male member and the other of the attachment members on the female member or the male member is secured to the second end of the secondary cable.

In at least one embodiment, the first member is the male member and the second member comprises the female member.

In various embodiments, one of the attachment members comprises an eye bolt.

In some embodiments, one of the attachment members comprises a clevis.

In some embodiments at least one aperture for a biased plunger on the first member comprises a threaded bore.

In at least one embodiment, a biasing force of the biasing element is adjustable.

In various embodiments, the first member is the female member and the second member is the male member. It is contemplated that the female member comprises at least two biased plungers, and the male member comprises at least two detents. Each detent is spaced at a different lateral position along the longitudinal axis of the body of the male member corresponding to at least one biased plunger from the female member when the shaft of the male member is inserted into the cavity of the female member. It is further contemplated that the attachment member of the female member comprises an eye bolt and the attachment member of the male member comprises a clevis.

In at least one embodiment, the attachment member on at least one of the male member or the female member comprises at least a portion of a clevis. The clevis secures the releasable connector to at least one flexible member, at least one rigid member, or both.

In at least one embodiment, the biased plungers are disposed in vertical alignment when the first member is viewed from a top.

In some embodiments, the biased plungers are spaced apart angularly about the longitudinal axis of the body of the first member when the first member is viewed from a top. It is contemplated that the biased plungers are equidistantly spaced apart angularly.

In a second aspect of the present invention, the invention provides a flexible conduit with at least two rigid members, at least one flexible member disposed between the at least two rigid members, and, a releasable connector. The releasable connector includes a female member and a male member. The female member has a body with an attachment member at a first end, a cavity having an open end at a second end of the body, and, a plurality of biased plungers. Each biased plunger is disposed in an aperture in the body and includes a biasing element for biasing the biased plunger. At least two biased plungers are disposed at a different vertical position along a longitudinal axis of the body of the female member. The male member comprises a shaft with a first end having an attachment member and a plurality of detents. The shaft is configured to be received in the cavity of the female member. Each biased plunger from the plurality of biased plungers of the female member is configured to engage a detent from the plurality of detents when the shaft of the male member is received in the body of the female member. The attachment member on at least one of the male member or the female member comprises at least a portion of a clevis, and the clevis secures the releasable connector to at least one flexible member, at least one rigid member, or both.

In some embodiments, the biased plungers are disposed in a relatively vertical alignment when the female member is viewed from a top.

In various embodiments, the biased plungers are angularly spaced apart about the longitudinal axis of the body of the female member when the female member is viewed from a top. It is contemplated that the biased plungers are equidistantly spaced apart from each other.

In a third aspect of the present invention, the invention provides a process for supporting a flexible conduit by securing a releasable connector to a flexible conduit having at least one rigid portion and at least one flexible portion. The releasable connector is configured to separate into at least two portions at a predetermined point of disengagement upon application of a predetermined force. In at least one embodiment of the present invention, the process further includes reengaging the portions of the releasable connector and re-securing the releasable connector to the flexible conduit after the releasable connector has separated.

A flexible conduit according to one or more embodiments is believed to provide sufficient support under most circumstances, but, under certain forces, will be capable of additional movement by the releasable connector disengaging to avoid the flexible conduit breaking. The releasable connector can be reengaged to return the flexible conduit to its supported position.

Additionally, a flexible conduit according to one or more embodiments is believed to provide sufficient support under most circumstances while allowing the flexible members to fully bend and flex as intended.

These and other aspects and embodiments of the present invention will be appreciated by those of ordinary skill in the art based upon the following description of the drawings and detailed description of the preferred embodiments.

BRIEF DESCRIPTION OF THE DRAWINGS

The attached figures in the drawings will make it possible to understand how the invention can be produced. In these figures, similar reference numbers denote similar elements.

DETAILED DESCRIPTION OF THE PREFERRED EMBODIMENTS

A new flexible conduit having a releasable connector to support the flexible conduit has been invented. The flexible conduit is supported, but, if the flexible conduit is subjected to certain forces, the support disengages so as to avoid the flexible conduit breaking or to allow maximum movement. Additionally, the flexible conduit that can be adjusted so that the amount of force needed to disengage the flexible conduit from the support is variable based upon particular applications. Finally, a flexible conduit with a secondary support to support the flexible conduit if a primary support has been disengaged.

Accordingly, with reference the attached drawings, one or more embodiments of the present invention will now be described with the understanding that the described embodiments are merely preferred and are not intended to be limiting.

Figure 1:
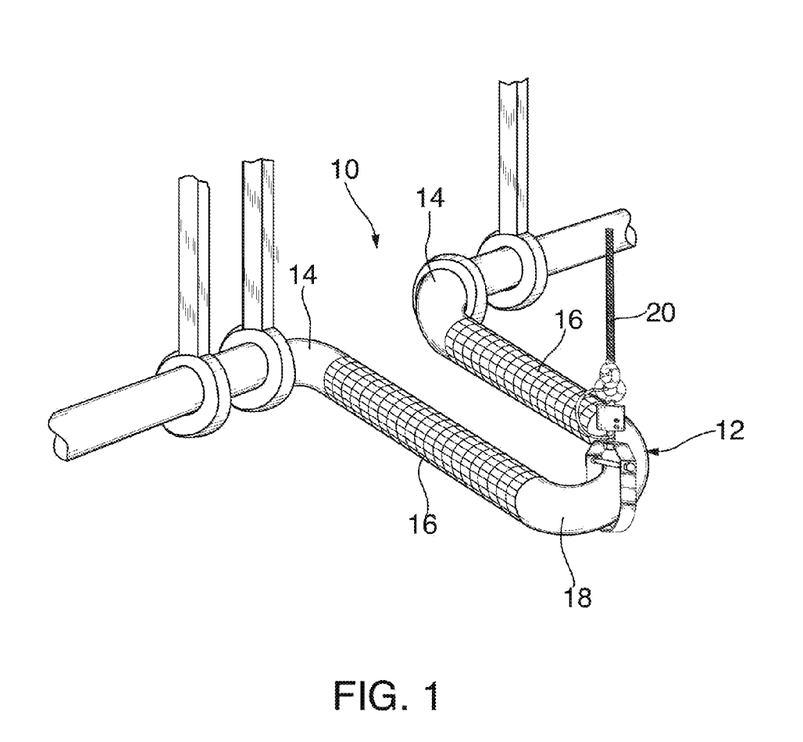
FIG. 1 is a top and side perspective view of a flexible conduit according one or more embodiments to the present invention.

As shown in FIG. 1, a flexible conduit according to the present invention includes, generally, a flexible conduit 10 and a releasable connector 12. The flexible conduit 10 may include for example, two rigid elbow members 14, two flexible tube members 16 (one connected to each rigid elbow member 14), and a rigid U-shaped member 18 disposed between the two flexible tube members 16. Other configurations may be used so long as the flexible conduit 10 includes at least one rigid member 14, 18 and at least one flexible member 16. In some configurations, the elbow members 14 may be formed at a 45 degree angle and the rigid member 18 may have a 90 degree angle (or a V-shape). In still other configurations, the rigid U-shaped member 18 may be replaced by two rigid 90 degree elbow members and an intervening flexible member. Other configurations are possible as well. The stiffness of the members 14, 16, 18 is typically in relation to each other, with the rigid members 14, 18 comprising metal, plastic, or the like, and the flexible members 16 comprising mesh covered conduits such as metal braided hose or another similar material. These materials are merely exemplary.

The releasable connector 12 is utilized to anchor the flexible conduit 10 to a support structure like a wall or ceiling, for example with a rod 20. A preferred releasable connector 12 is shown in FIG. 2 in which the releasable connector 12 includes a female member 22 and a male member 24.

Figure 2:
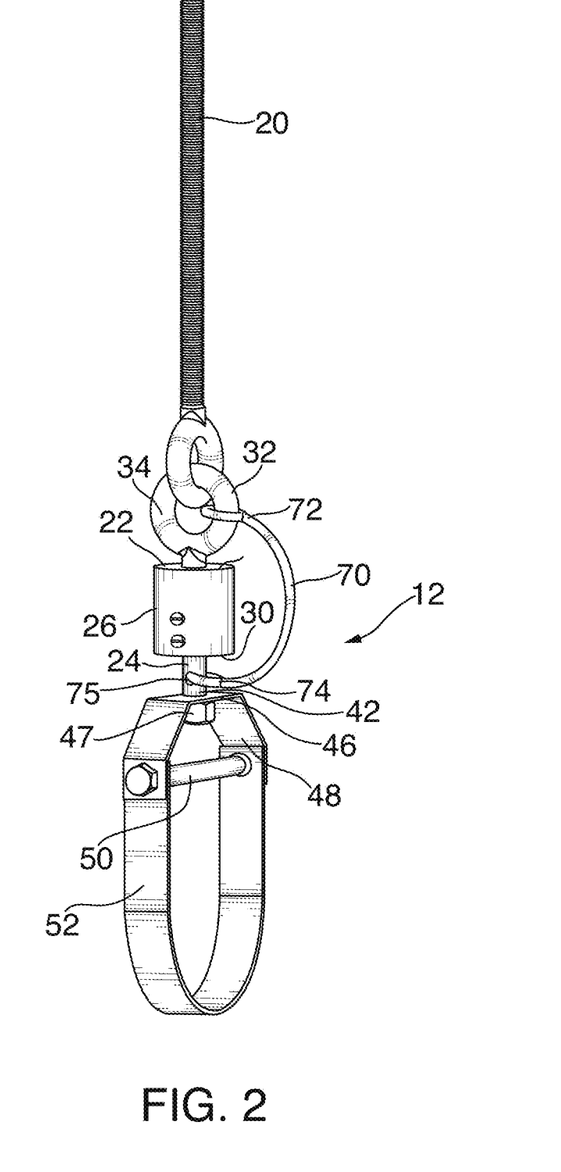
FIG. 2 is side perspective view of a releasable connector of the flexible conduit in FIG. 1.
Figure 3:
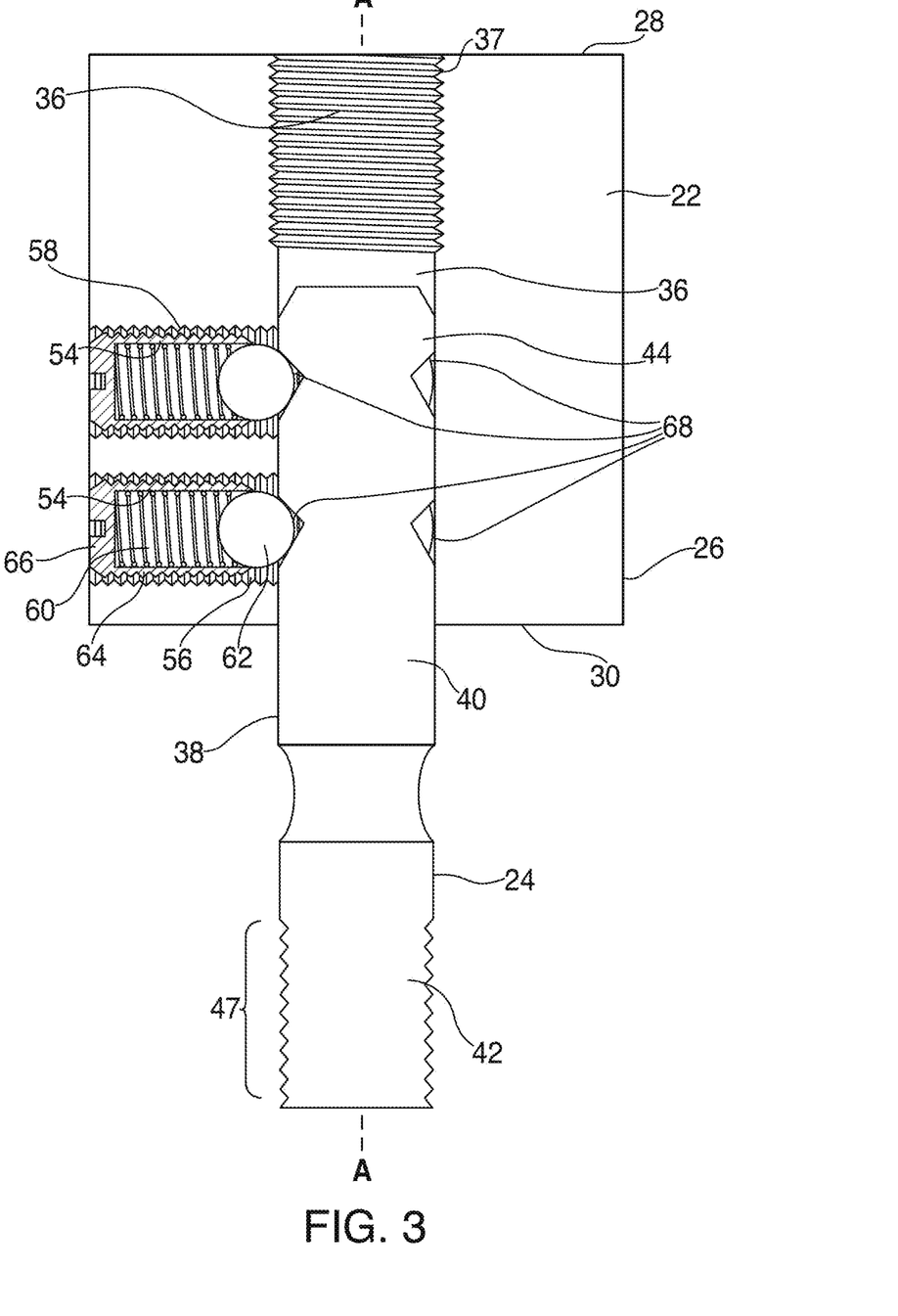
FIG. 3 is a side cutaway view of a portion of the releasable connector of FIG. 2.

With reference to FIGS. 2 and 3, the female member 22 includes a body 26 with a first end 28 and a second end 30. The first end 28 of the female member 22 has an attachment member 32, such as an eye bolt 34, which can be secured to the rod 20 which may be anchored to a wall or ceiling. As can be seen in FIG. 3, the eye bolt 34 includes a threaded shaft 35 which is received in a threaded aperture 37 in the first end 28 of the body 26 of the female member 22. The second end 30 of the female connector 22 is open, at least partially, allowing access to a cavity 36 in the body 26 of the female member 22 (discussed below).

The male member 24 includes a body 38 comprising a shaft 40 with a first end 42 and a second end 44. The second end 44 of the male member 24 is configured to be received in the cavity 36 of the female member 22. The first end 42 of the male member 24 includes an attachment member 46 which may be secured to the male member 24 by a nut 47 threaded onto a threaded portion 49 preferably on the second end 42 of the shaft 40. In an embodiment, the attachment member 46 comprises a clevis 48. The clevis 48 includes a pin 50 and a u-bracket 52 (or second u-shaped clevis) to secure about a member 14, 16, 18 of the flexible conduit 10 (see FIG. 1).

Although not depicted as such, it is also contemplated that attachment member 46 on the male member 24 is secured to one of the flexible members 16. Moreover, although it is depicted that the female member 22 is secured to the rod 20 and the male member 24 is secured to at least one member 14, 16, 18 of the flexible conduit 10, it should be appreciated that the configuration could be reversed, with the male member 24 secured to the rod 20 and the female member 22 secured to at least one member 14, 16, 18 of the flexible conduit 10. In some instances, based upon the length of the flexible tube members 16, the releasable connector 12 may be utilized to minimize sag associated with same.

The eye bolt 34 and the clevis 48 are merely exemplary attachment members 32, 46. Other structures may be used, for example, clips, clasps, threaded rods, screws, fasteners, and the like.

In the support arrangement of FIG. 1, in the normal use of the flexible conduit 10, the conduits to the left and right of the rigid elbow members 14 may normally experience axial contraction or expansion causing the two rigid elbow members 14 to move closer to each other or farther apart as the flexible members 16 flex. When this occurs, the U-shaped member 18 will move towards and away from the axis of the long conduits on either side of the rigid elbow members 14. As a result of this normal or intentional movement, the connection to the support rod 20 should allow for some accommodation of the movement in the flexible connector 12. Other configurations of connections that accommodate this intentional movement of the U-shaped member 18 relative to the support rod 10 can also be preferably utilized.

As shown in FIG. 3, the second end 44 of the male member 24 can be inserted into the cavity 36 of the female member 22. The female member 22 includes a plurality of biased plungers 54, each disposed in an aperture 56, preferable a threaded bore 58. The biased plungers 54 may each include a biasing element 60 and a ball 62. Although not required, the biasing element 60 is disposed inside of a housing 64 that includes an end 66 configured as a set screw. The end 66 can be rotated, moving the biasing plunger 54 inward (or outward) to increase (or decrease) the force required to overcome the biasing element 60. Alternatively, no housing may be provided and merely a set screw can be used to adjust the strength of the biased plunger 54. In either case, allowing the strength of the biased plungers 54 to be adjusted, will provide for a single releasable connector 12 to be tailored to various applications with different strength requirements. For example, the force required to overcome the biased plungers 54 (discussed below) is 1.5 times the weight of the member of the flexible conduit 10 that the releasable connector 12 is secured to.

Figure 4:
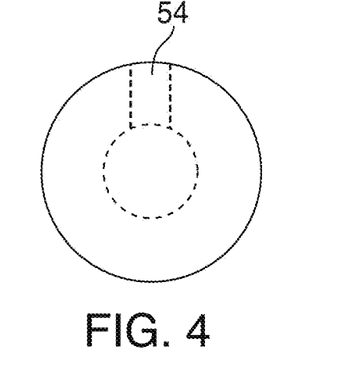
FIG. 4 is a top view of a female member of a flexible conduit according to an embodiment of the present invention.
Figure 5:
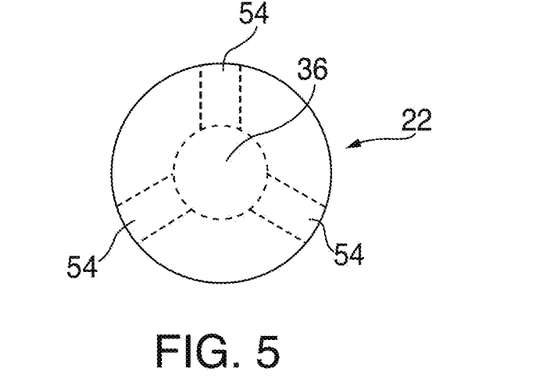
FIG. 5 is a top view of another female member of a flexible conduit according to an embodiment of the present invention.

Additionally, it is contemplated that any number of biased plungers 54 can be used, with two or more biased plungers 54 being preferred. As shown in FIG. 3, the biased plungers 54 may be disposed at different vertical positions along an axis running longitudinally along the body 26 of the female member 22 from the first end 28 to the second end 30. As shown in FIG. 4, when viewed from the top of the female member 22, the biased plungers 54 may be in axial alignment. Alternatively, as shown in FIG. 5, when viewed from the top of the female member 22, the biased plungers 54 can be disposed angularly about the longitudinal axis (running into and out of the paper) of the female member 22. Preferably, the biased plungers 54 are equidistantly disposed angularly about the longitudinal axis of the female member 22.

Returning to FIG. 3, in order to be secured to the female member 22, the male member 24 includes a plurality of detents 68 along the shaft 40 of the male member 24. The detents 68 are positioned such that when the shaft 40 of the male member 24 is in the cavity 36 of the female member 22, a first biased plunger 54 engages a first detent 68 and a second biased plunger 54 engages a second detent 68. Although not required, it is preferred that each biased plunger 54 engage a detent 68.

In use, if the force pulling the two members 22, 24 apart overcomes the forces of the biasing element 60 of the biased plunger 54, the male member 24 and the female member 22 will disengage because, as is known, ramped surfaces of the detent 68 will force the biased plunger 54 inward, as the male member 24 and female member 22 are pulled apart. Eventually, the ball 62 of the biased plunger 54 will be completely removed from the detent 68, allowing the male member 24 to be removed from the female member 22.

As shown in FIG. 2, in order to avoid the flexible conduit 10 from breaking and falling, a secondary support line 70 (such as a rope or cable) may be used. The secondary support line 70 includes a first end 72 and a second end 74. The first end 72 may be secured to the attachment member 32 of the female member 22 and the second end 74 of the secondary support line 70 may be secured to the attachment member 46 of the male member 24 such as through opening 75 in the shaft 40 of the male member 24. Once the male member 24 and the female member 22 of the releasable connector 12 (i.e., the primary support member) are disengaged, the secondary support member 70 will support the flexible conduit 10, until the primary support member (i.e., the releasable connector 12) can be reengaged. The length of the secondary support member 70 is sufficiently long to allow for disengagement of the male member 22 from the female member 22, but not so long as to allow deformation or breakage of the flexible conduit 10 when the male member 24 and the female member 22 are disengaged.

Figure 6:
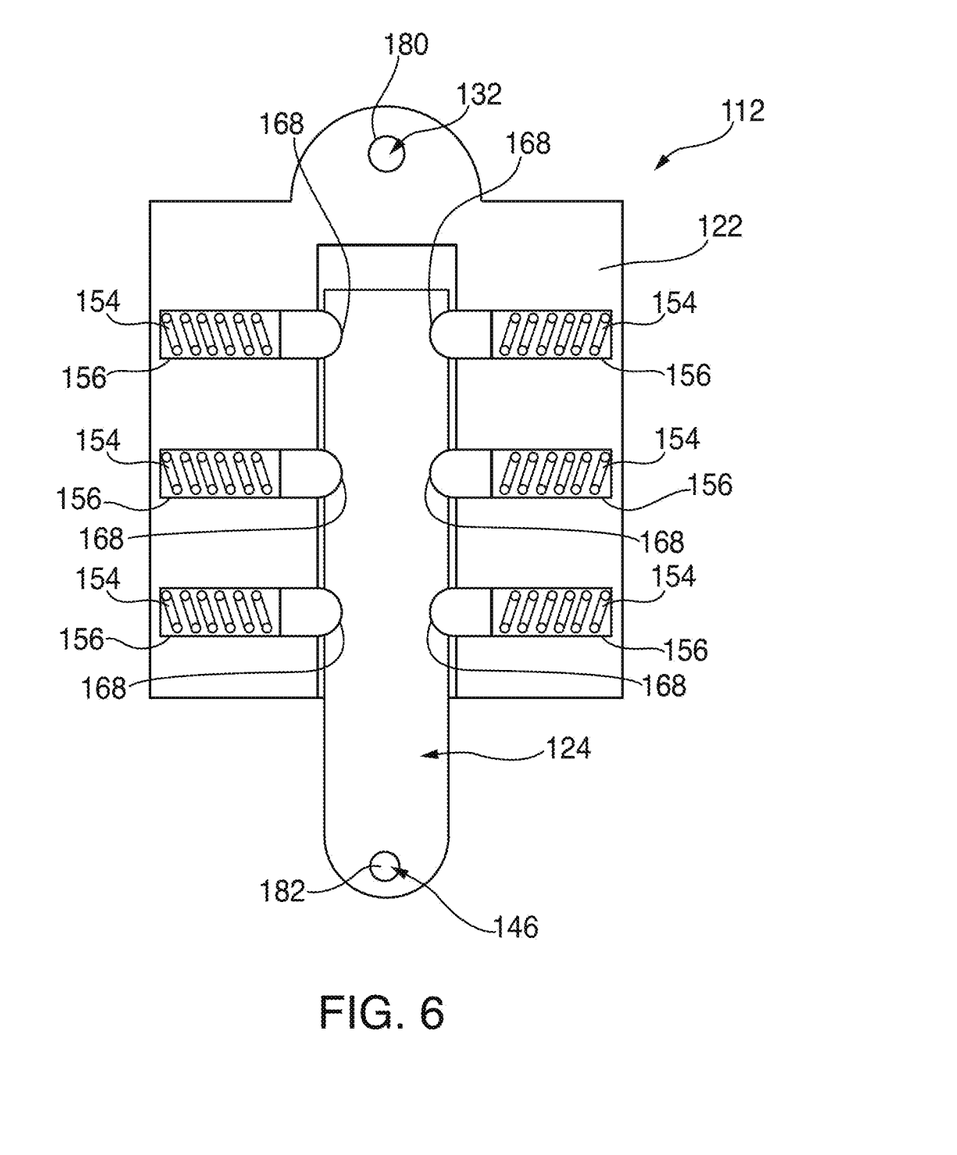
FIG. 6 is a side cutaway view of a releasable connector of according to an embodiment of the present invention.

As shown in FIG. 6, a releasable connection 112 is shown in which a female member 122 includes six apertures 156 each capable of receiving a biased plunger 154. The apertures 156 are in sets of two, with the apertures 156 in each set sharing a longitudinal axis. As will be appreciated, in such a configuration, one detent 168 will engage the two biased plungers 154 of the set.

Although the female member 122 is shown with six biased plungers 154, less than six could be used. This provides the ability to provide for one releasable connector 112 capable of multiple configurations with different strengths. It should be appreciated, that six biased plungers 154 are merely exemplary and that any number can be used. It is preferred, although not required, that the number of biased plungers 154 is even, and that the biased plungers 154 are equally spaced within the female member 122. Additionally, in the depicted embodiment, the male member 124 has three detents 168. As will be appreciated, depending on the number and/or the configuration of the biased plungers 154, one or more detents 168 may not engage a biased plunger 154 when the male member 124 is secured to the female member 122.

In this embodiment, the attachment member 132 on the female member 122 and the attachment member 146 on the male member 124 both comprise apertures 180, 182, respectively. As will be appreciated and although not shown, the apertures 180, 182 may receive another attachment member such as a hook, clip, cord, rope, tie, clevis, or the similar member to secure to at least one member (flexible or rigid) of the flexible conduit 10 or the support rod 20, as the case may be. Other configurations may also be used, including the clevis 48 and the eyebolt 34 shown in the configuration of FIGS. 2 and 3.

Figure 7:
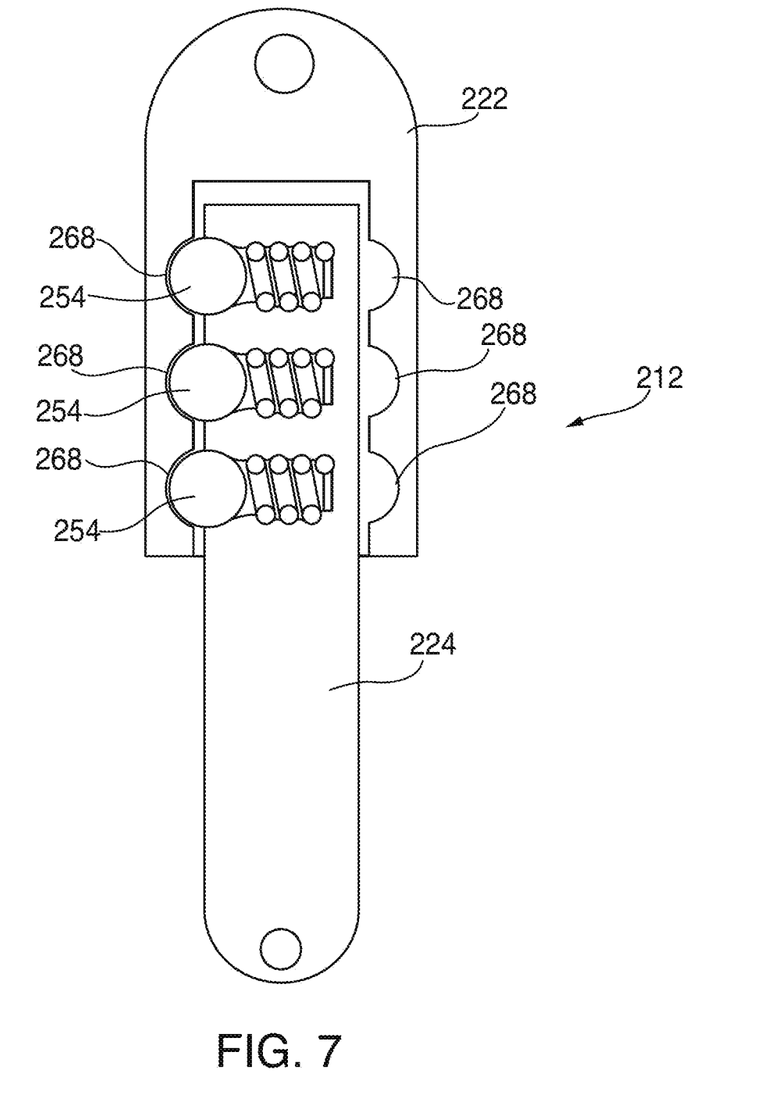
FIG. 7 is a side cutaway view of a releasable connector of according to an embodiment of the present invention.

In FIG. 7, an embodiment of the present invention is shown in which the releasable connector 212 comprises a male member 224 which includes a plurality of biased plungers 254. Accordingly, the female member 222 includes a plurality of detents 168. The remaining portions of this embodiment are similar to those previously discussed.

By using the releasable connector 12, 112, 212, the flexible conduit 10 will be supported, until a force is applied to disengage the male member 24, 124, 224 and the female member 22, 122, 222. This will minimize the chance that the flexible conduit 10 will break under excess forces or stress. Additionally, if the flexible conduit 10 includes the secondary support 70, even after the male member 24, 124, 224 and the female member 22, 122, 222 are disengaged, the flexible conduit 10 should remain relatively supported and less likely to injure a person, or completely fall and potentially break the flexible members 16 of the flexible conduit 10 apart. Additionally, as opposed to a rigid support, the use of the releasable connector 12, 112, 212 accommodates full range of flexibility of the flexible members 16.

As mentioned above, it is preferred that the force required to disengage the male member 24, 124, 224 and the female member 22, 122, 222 is preferably 1.5 times the weight of the flexible conduit 10. Other forces can be used. In general, the range will be between a lower limit of the weight of the flexible conduit 10 (or the supported member) and an upper limit that would break or destroy the flexible members 16. This upper limit can depend on a multiple variables including the materials of the flexible members 16 as well as the size and shape of the flexible members 16. For example, if it is desired that the releasable connector 12, 112, 212 disengage with very little force, the force required to disengaged can be 1% of the weight of the flexible conduit 10 or of the supported member(s) 14, 16, 18 of the flexible conduit 10. Again, the exact force desired will depend on a variety of variables.

Finally, in one aspect of the present invention, a flexible conduit, such as flexible conduit 10 in FIG. 1, is supported. The flexible conduit is supported by securing a releasable connector thereto. The releasable connector is also secured to a structural support, such as a ceiling, overhead floor joist, or a wall. The releasable connector is configured to separate into a least two portions upon application of a predetermined force. The two portions will separate at a predetermined point of disengagement. Unlike a rope, cable, rod of other similar member, releasable connectors are designed such that when the releasable connector separates, it is known beforehand approximately where the separation will occur. For a rope, cable, rod of other similar member, those may separate at any point, and most likely the weakest point along the length, which will not be known. It is preferred, although not required that the releasable connector is one that can be re-secured together once the releasable connector has separated. It is most preferred that the releasable connector comprises the releasable connector 12, 112, 212 depicted in the Figures herein. However, other releasable connectors such as breakaway bolts (i.e., bolts with a predetermined breakaway force at a particular point of disengagement) or other types of similar releasable or breakaway connectors may be used.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A flexible conduit comprising:
   at least one flexible member;
   at least one rigid member; and,
   a releasable connector comprising: a female member comprising a body with an attachment member at a first end and a cavity with an open end at a second end; and, a male member comprising a body with a shaft configured to be received in the cavity of the female member, the shaft of the male member comprising a first end having an attachment member;
   wherein a first member comprises one of the female member and the male member, and the first member further comprising at least one biased plunger, each biased plunger being disposed in an aperture and including a biasing element for biasing the biased plunger,
   wherein a second member comprises one of the female member and the male member, the second member being different than the first member, and the second member further comprising at least one detent, each biased plunger being configured to engage a detent to secure the shaft of the male member in the cavity of the female member, and,
   wherein one of the attachment members secures the releasable connector to at least one rigid member, at least one flexible member, or both, and
   wherein the first member and the second member are configured such that when connected to each other, the first member and the second member separate once a force pulling the first member and the second member apart is greater than a force required to overcome the biasing element.

2. The flexible conduit of claim 1 further comprising:
   a secondary cable having a first end and a second end, the first end of the secondary cable being secured to one of the attachment members and the other of the attachment members being secured to the second end of the secondary cable.

3. The flexible conduit of claim 1, wherein the first member comprises the male member and the second member comprises the female member.

4. The flexible conduit of claim 1, wherein one of the attachment members comprises an eye bolt.

5. The flexible conduit of claim 1 wherein one of the attachment members comprises a clevis.

6. The flexible conduit of claim 1, wherein a biasing force of the biasing element is adjustable.

7. The flexible conduit of claim 1, wherein the first member comprises the female member and the second member comprises the male member and wherein the female member comprises at least two biased plungers laterally disposed at a different position along a longitudinal axis of the body of the first member, and wherein the male member comprises at least two detents, each detent spaced at a different lateral position along the longitudinal axis of the body of the male member corresponding to at least one biased plunger from the female member when the shaft of the male member is inserted into the cavity of the female member.

8. The flexible conduit of claim 7, wherein the attachment member of the female member comprises an eye bolt.

9. The flexible conduit of claim 8 wherein the attachment member of the male member comprises a clevis.

10. The flexible conduit of claim 1, wherein one of the attachment members comprises at least a portion of a clevis, and wherein the clevis secures the releasable connector to the at least one rigid member of the flexible conduit.

11. The flexible conduit of claim 1, wherein the at least two biased plungers are provided and the biased plungers are disposed in vertical alignment when the first member is viewed from a top.

12. The flexible conduit of claim 1, wherein at least two biased plungers are provided and the biased plungers are spaced apart angularly about the longitudinal axis of the body of the first member when the first member is viewed from a top.

13. The flexible conduit of claim 12, wherein the biased plungers are equidistantly spaced apart angularly.

14. A flexible conduit comprising:
at least two rigid members;
at least one flexible member disposed between the at least two rigid members; and,
a releasable connector comprising: a female member having a body with an attachment member at a first end, a cavity having an open end at a second end of the body, and, a plurality of biased plungers, each biased plunger being disposed in an aperture in the body and including a biasing element for biasing the biased plunger, wherein at least two biased plungers are disposed at a different vertical position along a longitudinal axis of the body of the female member;
and, a male member comprising a shaft with a first end having an attachment member and a plurality of detents, the shaft configured to be received in the cavity of the female member, each biased plunger from the plurality of biased plungers of the female member configured to engage a detent from the plurality of detents when the shaft of the male member is received in the body of the female member, and,
wherein the attachment member on at least one of the male member or the female member is secured to at least one rigid member, at least one flexible member, or both, and
wherein the male member and the female member are configured such that when connected to each other, the male member and the female member separate once a force pulling the male member and female member apart is greater than a force required to overcome the biasing element.

15. The flexible conduit of claim 14, wherein the biased plungers are disposed in a relatively vertical alignment when the female member is viewed from a top.

16. The flexible conduit of claim 14, wherein the biased plungers are angularly spaced apart about the longitudinal axis of the body of the female member when the female member is viewed from a top.

17. The flexible conduit of claim 16, wherein the biased plungers are equidistantly spaced apart from each other.

18. The flexible conduit of claim 14, wherein the attachment member on the male member comprises the at least a portion of the clevis.

19. The flexible conduit of claim 1 further comprising: a secondary support line attached to the first member and the second member.

* * * * *